United States Patent [19]

Perugini et al.

[11] 4,164,553

[45] Aug. 14, 1979

[54] PLASMA ARC PROCESS FOR THE PRODUCTION OF CHEMICAL PRODUCTS IN POWER FORM

[75] Inventors: Giancarlo Perugini, Novara; Enzo Marcaccioli, Perugia, both of Italy

[73] Assignee: Montedison S.p.A., Milan, Italy

[21] Appl. No.: 768,572

[22] Filed: Feb. 14, 1977

[30] Foreign Application Priority Data

Feb. 17, 1976 [IT] Italy ............................ 20241 A/76

[51] Int. Cl.$^2$ .................. C01B 31/30; C04B 31/16
[52] U.S. Cl. .................. 423/440; 75/0.5 BB; 75/0.5 BC; 106/39.5; 106/43; 106/44; 106/288 B; 423/289; 423/297; 423/344; 423/345; 423/346; 423/406; 423/439
[58] Field of Search ............... 423/440, 345, 346, 439, 423/289, 291, 297, 344, 406, 659; 75/0.5 BB, 0.5 BC; 106/43, 44, 299, 39.5, 288 B

[56] References Cited

U.S. PATENT DOCUMENTS

| | | | |
|---|---|---|---|
| 3,257,196 | 6/1966 | Foex | 75/0.5 BB X |
| 3,485,586 | 12/1969 | Swaney | 423/440 |
| 3,661,524 | 5/1972 | Holden et al. | 423/440 |
| 3,723,601 | 3/1973 | Svanstrom | 423/440 X |
| 3,761,576 | 9/1973 | Groening | 423/440 |
| 3,839,542 | 10/1974 | Chase | 423/440 X |
| 3,851,136 | 11/1974 | Venus et al. | 75/0.5 BB X |
| 3,960,545 | 6/1976 | Port et al. | 75/0.5 BC X |

FOREIGN PATENT DOCUMENTS 1069748  5/1967  United Kingdom ...................... 423/440

*Primary Examiner*—Edward J. Meros
*Attorney, Agent, or Firm*—Stevens, Davis, Miller & Mosher

[57] ABSTRACT

A plasma-arc process is disclosed for the production of powders of various chemical products, according to endothermic reactions, such as TiC and the like. The process consists essentially in carrying out, in a furnace with an anodic function without dissipative cooling, a series of steps comprising:

(a) forming a chemically reactive fluidodynamic mass having a high thermal content and a high concentration of the desired reactive species, by injecting into the electronic column of a plasma-arc of a noble gas at least one reactant selected from the class consisting of metal and metalloid halides, the injection taking place, with mixing through a choker-injector-mixer nozzle which is electrically insulated;

(b) causing the electronic condensation of said mass inside a main nozzle anode without dissipative cooling; and (c) injecting into said electronically condensed mass the residual part of said reactants necessary to the desired main chemical reaction for producing the chemical powder. The total volume of the reactants is equal to or greater than 20% of the total aeriform volume formed by the total volume of the reactants plus the volume of noble gas that pilots and stabilizes the plasma-arc itself. The electronic condensation takes place inside a nozzle-shaped main anode without dissipative (forced) cooling, which nozzle anode is made of tungsten or graphite, and preferably the latter. Powders having the function of nucleation such as dispersion agents, may also be introduced into the reaction zone. If desired, a subsequent reaction may be brought about by the chemical and/or physical interreaction of one or more reactants introduced into a zone of the furnace located below the zone in which the main reaction takes place. The process also contemplates the use of hydrogen only as a reactant of a desired chemical reaction, said hydrogen being injected into the fluidodynamic mass only after this latter has condensed itself electronically inside the nozzle-shaped main anode. Examples are given wherein TiC powder is produced from TiCl$_4$ and CH$_4$, employing only argon as the gas for the plasma-arc.

8 Claims, 3 Drawing Figures

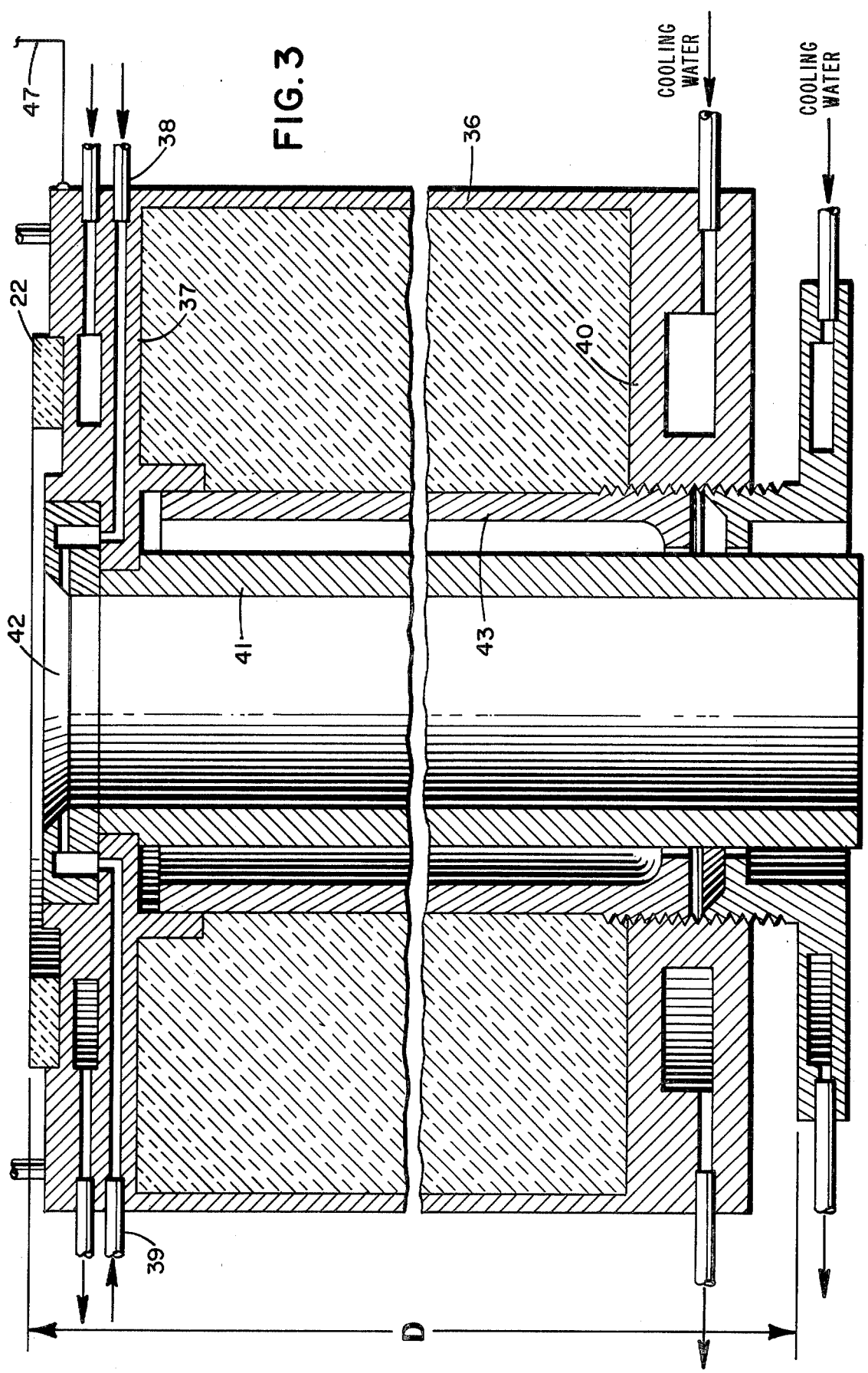

PLASMA ARC PROCESS FOR THE PRODUCTION OF CHEMICAL PRODUCTS IN POWER FORM

The present invention relates to an improved electrothermal process for the preparation of carbide or nitride powders or metalloceramic (cermet) powders in an arc-plasma furnace having a dissipative cooling-free anode.

As is well known, under equal conditions of energy content (enthalpy) a plasma generated by a gas that is monatomic under normal conditions (viz., a noble gas) possesses a temperature that is far greater than that of a plasma generate by a gas consisting of biatomic molecules (ordinary gases).

As a matter of fact, at 80 Kcal/mol, hydrogen plasma has an average temperature of 3880° K. while argon plasma as an average temperature of 11,000° K.

In the plasma-generating devices with non-consumable electrodes, continuous operation is ensured by means of a vigorous cooling which is applied to the electrodes themselves. In direct current arc-type devices, the positive electrode (anode) is that which receives the electron beam of the plasma arc; this plasma arc, because of the very high temperature that is developed, creates in the anode zone on which it impinges very high energy density values. In order to avoid melting, particularly of said anode, there is provided a means for intensive cooling (for instance by means of a forced refrigeration circuit, almost always by water).

This necessity for providing means to avoid melting causes in the plasma-generators energy losses that may reach up to 50% and more in the case of plasmas of noble gases, and up to 25% and more in the case of plasmas of ordinary gases, with respect to the total energy applied to the plasma arc.

Thanks to the phenomenon of atomic re-association that re-generates the original molecules, the plasmas of non-noble gases, display a longer thermally useful life, while, on the contrary, the noble gas plasmas, for just the opposite reason, show a faster thermal decay.

For the application to chemical reactions where the reactivities are such as to require the supplying of heat and high temperatures, particular attention was paid to ordinary gas plasmas.

More particularly, hydrogen plasmas were experimented with and used in systems in which, besides the minor energy losses and the slighter decay of the thermal level, there was an interest for using the reducing properties of hydrogen towards the reactants to be taken into consideration, as in the case of the reaction between $TiCl_4$ and a halogenated hydrocarbon, such as for instance $CCl_4$, in order to produce TiC.

In the processes of the prior art, attempts to use graphite anodes failed because in the argon plasma the high temperature in the zone of impact of the plasma arc caused a vaporization of the graphite, while in the hydrogen plasma there occurred a chemical corrosion of the graphite owing to the formation of hydrocarbons. Consequently, the plasma reactor commonly used in the hydrogen plasma reactor had metal electrodes protected by means of a forced dissipative water-cooling circuit.

In the case of products that are thermodynamically more difficult to obtain (e.g., TiC), it happens, moreover, that the conversion of the reactants is low, while the consumptions both of the plasma-forming gas as well as of the electric power necessary to the plasma arc per each kilogram of product obtained are high.

The processes of the prior art are characterized, moreover, by a low concentration of reactants, i.e., the ratio of the total volume of the reactants with respect to the total volume of the gaseous system (i.e., the gas for the formation of the plasma+the gas of the reactants injected into it) is low.

Thus, an object of this invention is that of providing an improved electrothermal process that will eliminate all the drawbacks and limitations of the processes of the prior art.

This object, surprisingly, is achieved by the discovery that the carbides which are prepared in an argon plasma are from the economical point of view, more convenient and that they possess better characteristics of resistance to oxidation at a high temperature than the carbides prepared in a hydrogen plasma.

Moreover, it has been observed that, surprisingly enough, not only is it possible for graphite to function as the main anode without the anode suffering any wear through vaporization (or sublimation) in an argon plasma, but also that is is also possible (in spite of the very high temperature of the argon plasma) to use not only graphite anodes, but also non-cooled tungsten anodes, without suffering any damage whatsoever to these anodes.

All the above-cited advantages are achieved in practice by a plasma-arc process for the production of powders of various chemical products, according to endothermic reactions, which process consists, according to this invention, in providing in a furnace with a non-dissipative cooling-free anode function, and for continuous operation, the following operational phases which consist or consist essentially of:

(a) forming a chemically reactive fluidodynamic mass, having a high caloric content and a high concentration of the desired reactive species, by means of the injection into the electronic flow of a plasma-arc of a noble gas, of one or more halides of one or more metals or of one or more metalloids which are passed through a choking-injecting-mixing nozzle arranged in a condition of electrical insulation; then (b) condensing said fuidodynamic mass in a nozzle-shaped main anode without the (forced) dissipative cooling system; and last, (c) injecting into the resulting electronically condensed mass the remaining part of one or more reactants necessary for realizing the desired chemical reaction considered as the main one.

By the process according to the present invention, the above mentioned positive results are obtained thanks to the fact that hydrogen (as the plasma-forming gas) is substituted by a noble gas such as for instance argon or helium (preferably argon), resorting at the same time to the use of a furnace with an anode function of the type that described hereinafter and as shown in the drawings, in which it is even possible to use graphite as anodic material for supporting or containing the electronic condensation of the plasma arc.

Alternatively, there may be used a refractory metal such as tungsten, although, in general, preference is given to the use of graphite within the range of operational conditions of the process of this invention.

BRIEF DESCRIPTION OF THE DRAWINGS

FIG. 3 shows a cross-sectional view of the bottom portion, D, of the furnace apparatus.

Figure 1:
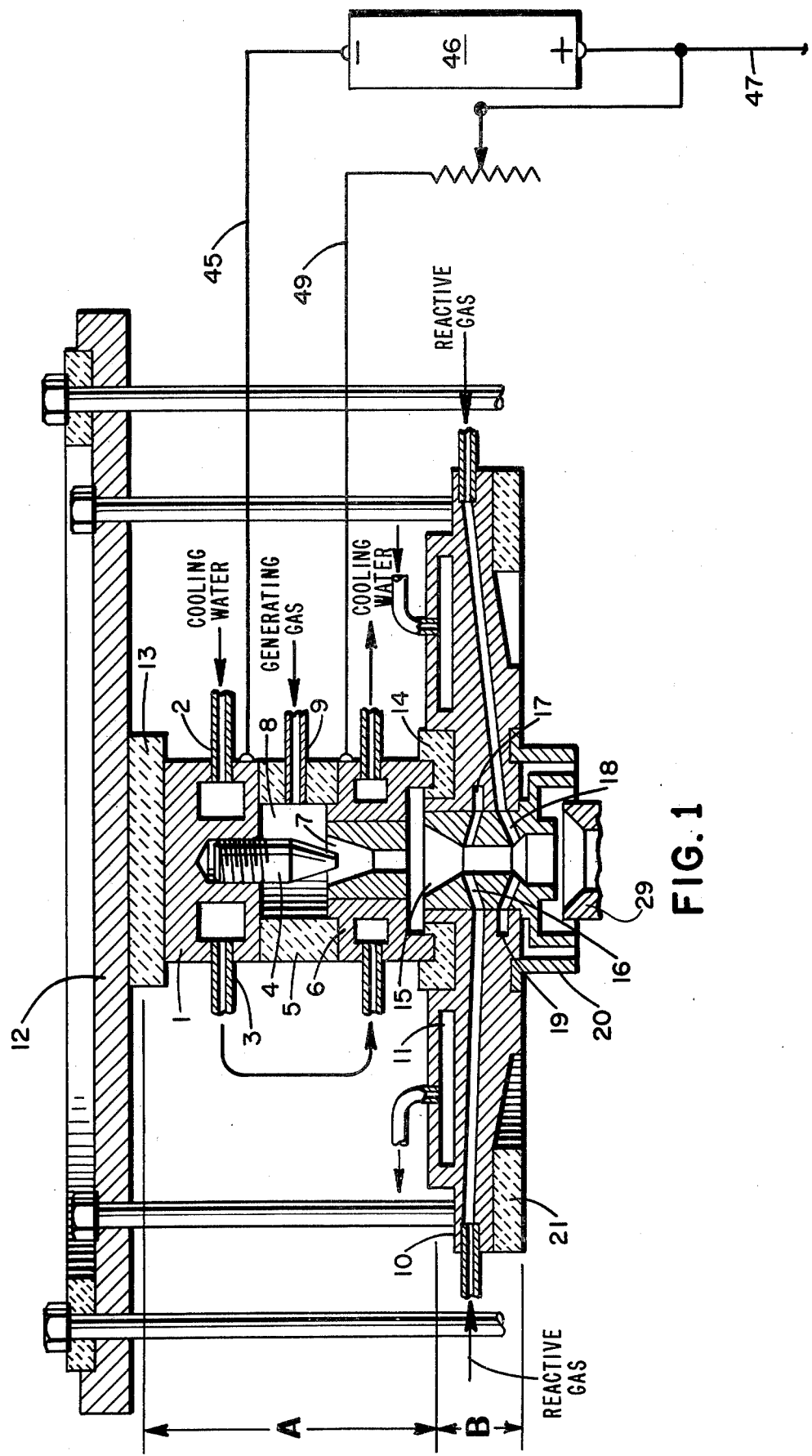
FIG. 1 shows a cross-sectional view of the top portion, i.e., parts A and B, of the furnace apparatus.

The advantages of the present process are achieved when one operates in such a way as to obtain first a high caloric content and a high contentration of the reactive species of reactant, by injecting one or more metal or metalloid halides into the noble gas plasma, in order to produce a chemically reactive fluidodynamic mass. Thereupon, after having realized the corresponding electronic condensation of the arc inside a main nozzle-shaped anode, one or more reactants are injected into said chemically reactive fluidodynamic mass, in order to achieve the chemical reaction under consideration.

The process is carried out in practice in the absence of any hydrogen not required by the stoichiometry of the particular chemical reaction under consideration, and in the presence of limited quantities of a noble gas, and in such a way that the starting concentration of the reactants (in the cold state) with respect to the total gaseous system (i.e., the ratio of the gas of reactants to plasma gas+gas of reactants) is equal to or greater than 20% by volume.

The possible reacting hydrogen may at any rate be introduced below (i.e., down stream) from the anodic zone wherein the condensation of the electronic discharge of the plasma arc takes place.

The advantages offered by the process according to this invention, with respect to those of the prior art include the following:

greater conversion values of the reactants;

lower thermal dispersions and, thus, a greater energy efficiency which in turn results in a lower energy consumption per kilogram of obtained product;

a greater plant output;

a lower consumption of plasma-forming-gas per unit quantity of obtained product;

improved granulometric characteristics of the powders thus produced;

a lower ratio between the gas used for forming the plasma and the power applied to the plasma arc;

a longer cathode life, in consequence of the fact that it is maintained in an atmospheric of argon only.

The invention will now be described in more detail according to a preferred but not an exclusive form of practical embodiment, with reference to the attached drawings, given for purely illustrative and not limiting purposes, in which the figures represent an axial cross-section of an apparatus particularly suited for carrying out the process according to this invention. The apparatus per se is not the subject of this application, in as much as it consists or consists essentially of a conventional hydrogen plasma arc apparatus, combined in cascade with an improved furnace as described herein.

In the attached figures, the conventional plasma-generator is represented by the part indicated on the drawing as —A—, while the plasma-arc-furnace consists of the complex of parts indicated as —B——C—D—.

As shown in FIG. 1, the plasma generator consists, thus, of a cathodic section 1 provided with a cooling system consisting of an annular cavity with an inlet 2 and an outlet 3 for cooling water; an interchangeable tungsten cathode 4, enclosed in a tubular, electroinsulating element 5; an anodic section 6 with a water-cooling system similar to that for the cathodic compartment; an anodic interchangeable copper nozzle 7; and a plasma arc generating and blowing chamber 8 having an inlet 9 for the plasma generating gas.

All the elements from 1 to 9 are enclosed between a supporting flange 10 fitted with a cooling system 11, and the opposited coupling plate 12. These elements are arranged between an electroinsulating disc 13 and an electroinsulating coupling and an insulating sealing ring 14.

Practically the whole of part —A— is located between disc 13 and insulating ring 14. Supporting flange 10, provided with an annular cavity 11 for cooling water, forms the coupling element joining it to the furnace with anode function which comprises the parts indicated collectively as —B—C— and —D—.

The furnace includes, in part —B—, a choking-injecting-mixing nozzle 15 for the electronic column of the plasma arc, made of graphite and electrically insulated. The furnace is fitted with a first series of injector nozzles 16 arranged tangentially so as to generate a vortex and connected to a distribution cavity 17, and with a second series of nozzles 18, likewise arranged tangentially and connected with a feeding cavity 19 (like cavity 17) for the feeding of the reactive plasmogenous gas additioned or non-additioned with one or more reactants.

A graphite cylinder 20 acts as a screen for the nozzle 15.

Figure 2:
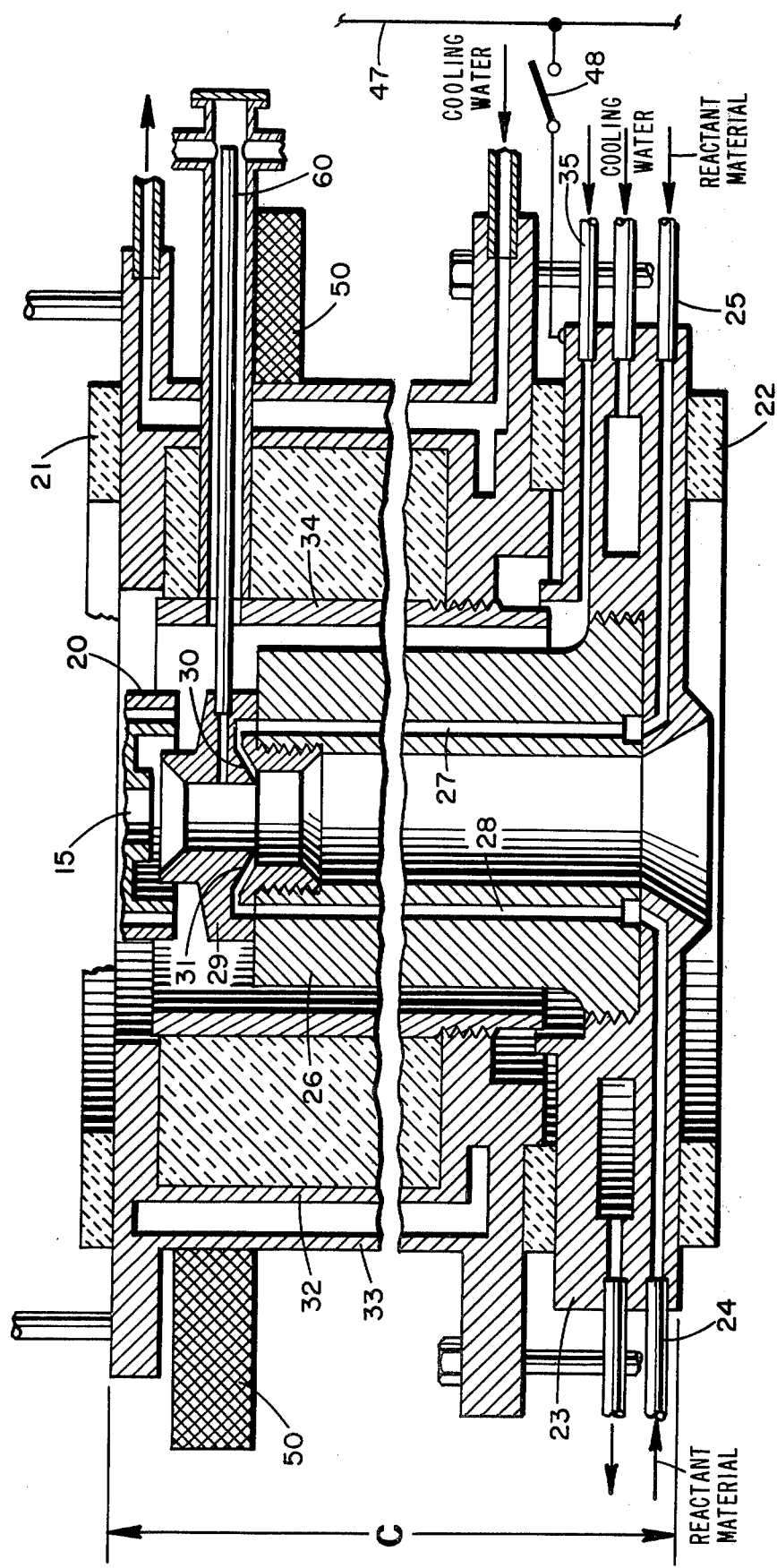
FIG. 2 shows a cross-sectional view of the middle portion, C, of the furnace apparatus.

Referring to FIG. 2, the main anodic head (part —C—) is enclosed between the two insulating rings 21 and 22 and is supported by a base flange 23 provided with an anular cooling cavity and two inlets 24 and 25 for one or more reactants. On the base flange 23 there is fitted a graphite anodic tube 26 provided with two holes or ducts 27 and 28 for the feeding in of the injected material, which ducts are respectively connected with inlets 25 and 24.

Onto the top of anode tube 26 a main anode 29 is screwed on; this main anode is made of tungsten and is provided with a first injecting nozzle 30 fed by the inlet 25 and duct 27 and a second nozzle 31 fed through inlet 24 and duct 28. Moreover a radial injector nozzle 60 may also be provided.

The graphite anodic tube 26 and the corresponding anode 29 are enclosed between two concentric cylindrical metal sleeves 32 and 33 affording an annular space forming a water-cooled cylindrical cavity. The anodic tube 26 is surrounded by a graphite cylinder 34 acting as a screen, while the annular air space or cavity between cylinder 34 and sleeve 32 is filled with an insulating (nonconducting) spongy graphite material, or carbon black, or graphite wool, or the like.

35 indicates the inlet for the plasma generating reactive gas, additioned or non-additioned with one or more reactants, directed to the furnace.

As shown in FIG. 3, the end section of the furnace, —D—, consists of a cylindrical furnace body 36 closed, on the top, by a flange 37 which incorporates a cooling system having two inlets 38 and 39 for reactants or for the materials injected into the center of the furnace, and at the bottom by a sealing flange 40 provided with a water cooling system.

Within the furnace body 36 there is arranged concentrically a graphite tube 41 having an upper insulating graphite ring 42, shaped in such a way as to form nozzles serving to inject into tube 41 the reactants or material fed through the ducts 38 and 39.

A concentrically-arranged graphite cylinder 43 acts as a screen surrounding the tube 41, while between the inner surface of cylindrical body 36 and cylinder 43 an insulating material 44 is disposed which may be like that mentioned above between elements 32 and 34.

The apparatus is then completed by suitable electrical power connections consisting, for example, as shown in FIGS. 1-3, of a cathodic line 45, a power feeder 46 for direct current, an anode line 47, an auxiliary switch 48, an auxiliary pilot anode line 49, and an electromagnetic field coil 50.

A condition of particularly desirable resistance and efficiency of said furnace is achieved when to the gases fed into the plasma through the choker nozzle 15, a vigorous rotational motion is imparted and/or the last part of the plasma arc column is radially distorted or twisted.

Another favorable condition is achieved by means of the rotation of the plasma arc (with respect to the surface of the main anodic tube 26 on which the discharge is condensed or concentrated); a rotation which is obtainable by the application of a magnetic field. The magnetic field may be induced (according to per se standard procedures known in the prior art) or self-induced by the anodic current itself flowing through coil 50.

The furnace represents a plasma arc device in which a tube 26 having an anodic function is used under insulating conditions.

The tube with an anodic function 26 carries or supports an anode 29 in whose nozzle the plasma arc condenses electronically.

The process according to this invention above all consists or consists essentially in producing (upstream of the anode 29 which is not cooled and which may be made of tungsten or graphite) a chemically reactive fluidodynamic mass having a high thermal content and a high concentration of reactive species. This mass is obtained by injecting into the noble gas plasma (e.g., argon) one or more reactants consisting of one or more metal or metalloid halides. The noble gas plasma is preliminarily produced by means of a conventional plasma generator consisting of the component elements marked from 1 to 9 (section—A—of FIG. 1).

The chemically reactive fluidodynamic mass is produced by the injection as specified above and which is accomplished and conducted by means of the section—B—which comprises the choker-injector-mixer-nozzle 15, section—B—fulfilling the threefold function of choker the plasma arc in nozzle 15, injecting into this latter, through tangentially arranged injection nozzles 16 and 18, one or more reactants preferably consisting of metal or metalloid halides, and imparting to them a vortical or whirling mixing effect, thanks to the whirling motion imparted to the reactants by tangential injection through nozzles 16 and 18.

The injection of the first type of reactant (particularly the halides) allows one, amongst others, to energize the plasma arc through or over a greater voltage absorption value.

In fact, it is known that an argon plasma, for certain given electrical current intensities, develops a poor voltage absorption with a consequential limitation in the value of the electrical power in the plasma arc.

Therefore one arranges that the thus-formed and energized fluidodynamic mass shall have a high thermal content and possesses a high concentration of the reactive species following the high rate of impacts which then occurs between the column of electrons of the arc and the chemical species injected into the former. At the same time the noble gas (preferably argon) guides and stabilizes the plasma arc itself.

Inside the nozzle of the main anode 29 the electrons of the arc current (dispersed inside the chemically reactive fluidodynamic mass), electronically condense themselves or are drawn off, closing the power circuit of the plasma arc. In the lower part of anode 29, through radial injector nozzle 60 and through downwardly slanting nozzles 30 and 31, one or more reactants of the second type (e.g., $CH_4$, $H_2$, $NH_3$, etc.) may be injected, as required by the stoichiometry of the desired main reaction. The expression "main reaction" is employed herein to distinguish it from other reactions that may be conducted later.

On the fluidodynamic mass deprived of the electrical current electrons which have been absorbed in the anode condensation, the injected reactants of the second type just mentioned, thanks to the high thermal content and to the high concentration of the active and reactive chemical species, find suitable reactive conditions, both with respect to the thermodynamic aspects as well as with respect to the kinematic aspects, that are conducive to bringing about the desired main reaction.

Nozzles 30 and 31 are used for injecting, as already indicated, the second type of reactants (e.g., $H_2$, $NH_3$, etc.) whose pre-heating through the inlet holes 27 and 28 of the anode tube 26 will be beneficial to the chemical reaction that one wishes to obtain.

On the contrary, however, radial nozzle 60 is used when one or more reactants of the second type (e.g.,: $CH_4$, $C_2H_2$, $Ni(CO)_4$ etc.) are required to be only slightly pre-heated, in order to avoid decomposition thereof before coming into contact with the chemically reactive fluidodynamic mass.

Obviously, main anode 29 may have different geometrical configurations or shapes, and may be made of graphite and/or tung sten, although graphite is the preferred material.

The process, as herein-above described, is moreover characterized (besides the absence of any hydrogen that is not required by the stoichiometry of the desired chemical reaction) by a limited quantity of noble gas with respect to that of the reactants, so that the starting or initial concentration of these latler (considered as of the still uncompleted reaction and in the cold state) is at least 20% by volume with respect to the total gaseous system (gas of the plasma+reactants of the first type++reactants of the second type).

If the main reaction requires hydrogen as a reactant, such hydrogen is desirably injected below the anodic zone where the condensation of the electronic discharge of the plasma arc takes place.

The process according to the present invention offers advantages that are greater with increasing concentrations of reactants (over 20% in volume) with respect to the total gaseous system (plasma gas+reactants of the first type+reactants of the second type).

The energizing of the plasma arc of the noble gas may also be obtained by injecting into the plasma one or more reactants of the second type (e.g., $CH_4$, $C_2H_2$, $NH_3$, etc.), but the fluidodynamic mass thus obtained displays a lower chemical reactivity together with other drawbacks (such as for instance an easy clogging of the nozzle of the main anode). Consequently, the energization of the plasma arc of the noble gas is preferably achieved by injecting into it one or more reactants of the first type (halides of one or more metals and/or one or more metalloids).

Preferably the process according to this invenion is carried out by using a graphite tabular anodic support 26 and a main anode 29, also of graphite, fitted with injector nozzles 60 and/or 30 and 31.

Through said injector nozzles there may be introduced, together with the gaseous or gasifiable reactants, one or more solid substances in the form of a fine powder, in order to achieve one of two distinct aims which are as follows:

The first of these aims is that of using the injected powder as a nucleant (nucleating agent) and accretion nucleus or seed for obtaining, for instance, powders of a greater granular size. In this case, the injected powder is the same as the powder to be produced by the main reaction. This technique offers the possibility of controlling the granulometry of the powders obtained by the process, for instance, of carbides or nitrides or metals (e.g., TiC, $Si_3N_4$, B, etc.).

The second aim is that of using the injected powder as a dispersion agent with respect to the powder to be produced by the main reaction. In this case, the injected powder or powders are chemically different from that to be produced by the main reaction. Thus there may be obtained cermet-compositions where one phase is dispersed in a second phase (e.g., TiC—Ni).

Obviously, other series of similar injectors (60, 30 and 31) may be placed at an intermediate height or heights of the anodic tube 26 in those cases in which this is desirable by reasons of the type of powder to be injected.

The process according to the present invention contemplates also the use of the powder produced by the main chemical reaction combined with the function of germination and growth nuclei of composite material, when said powder is subjected to a subsequent reaction.

The subsequent reaction may be brought about by the chemical and/or physical interaction of one or more reactants introduced into a zone of the furnace located below that in which the main reaction occurs, i.e., downstream of the main reaction.

The reactants required by such a subsequent reaction are introduced, singly or in admixture with each other, through ducts 38 and 39 communicating respectively with injector nozzles arranged in the graphite ring 42.

The process according to this invention is conveniently employed for the operation of endothermic high-temperature reactions such as, for instance, those connected with the production of:

ceramic carbides (e.g.,: TiC, SiC, $Cr_3C_2$, $B_4C$, TaC, WC, MoC, NbC, etc.);
mixed ceramic carbides (e.g.,: WC-MoC, WC-TaC, WC-TaC-MoC, etc.);
ceramic nitrides (e.g.,: $Si_3N_4$, TiN, etc.);
metal borides (e.g.,: $TiB_2$, ZrB, CrB, etc.);
metals (e.g.: B, Ni, Mo, Cr, Ti, Si, etc.);
metal chlorides (e.g.,: $TiCl_3$ by partial reduction of $TiCl_4$);
intermetallic products (e.g.,: Si—Mo);
cermet products (e.g.,: metal-ceramic carbides);
composite products (e.g.,: $Si_3Ni_4$—nickel);
organic products (e.g.: acetylene);
inorganic products (e.g.,: hydrocyanic acid).

The products obtainable by the above described process, even when in the state of a submicron-sizes powder, are not pyrophoric.

For simplifying and non-limiting purposes, following are six examples of which the first and the second are given for comparative purposes.

EXAMPLE 1

This example shows the preparation of TiC starting from $TiCl_4$ and $CH_4$ in a hydrogen plasma according to known process and equipment; and more precisely, according to the apparatus represented by part—A—of the attached drawing wherein two nozzles for the injection of the reactants are respectively located, one in the anodic nozzle 7 and the radially below the anode 7 itself.

This example is based on two tests whose operational conditions were as follows:

| In the first case: | |
|---|---|
| Electric current intensity | 115 Amp. |
| Total electric power | 11.5 Kw |
| Arc voltage | 100 V |
| Feeding rate for the arc gas (hydrogen) | 1500 Nl/hr |
| Plasma temperature at outlet from anode 7: | 3300° C. |
| Distance of injector from inlet of anode 7: | 1.5 cm |
| Gaseous mixture fed into anode 7 injector: | |
| $TiCl_4$ | 0.36 kg/hr |
| | (equal to 42.5 Nl/hr) |
| $CH_4$ | 84.0 Nl/hr |
| | (equal to 0.06 kg/hr) |
| Molar ratio $\frac{TiCl_4}{CH_4} \simeq 0.50$ | |
| Product obtained – TiC | 0.102 kg/hr |
| Theoretical conversion with respect to the $TiCl_4$ | 89.6% |
| Theoretical conversion with respect to the $CH_4$ | 45.5% |
| Concentration of the reactants ($TiCl_4$ + $CH_4$) in the injected plasma ($H_2$ + $TiCl_4$ + $CH_4$): | |
| $\frac{42.5 + 84}{42.5 + 84 + 1500} \cdot 100 = 7.8\%$ by vol. | |
| Power consumption (KWh) per kg of TiC | 112.8 KWhr/kg |
| In the second case: | |
| Total power | 45 KW |
| Arc gas feed (hydrogen): | 11760 Nl/hr |
| Injected reactants: | |
| $TiCl_4$ | 8.64 kg/hr |
| | (equal to 1020 Nl/hr) |
| $CH_4$ | 1020 Nl/hr |
| | (equal to 0.728 kg/hr) |
| Molar ratio $\frac{TiCl_4}{CH_4}$ | 1.0 |
| Concentration of the reactants: ($TiCl_4$ + $CH_4$) in the injected plasma ($H_2$ + $TiCl_4$ + $CH_4$): | |
| $\frac{1020 + 1020}{1020 + 1020 + 11700} \cdot 100 = 14.8\%$ by vol | |
| Theoretical conversion (with respect to $TiCl_4$ and $CH_4$) | 51% |
| Hourly output of TiC | 1.39 kg/hr |
| Power consumption (KWh) per kg. of TiC | 32.3 KWhr/kg. |

EXAMPLE 2

This example illustrates the preparation of TiC from $TiCl_4$ and $CH_4$ injected into a hydrogen plasma (83.5% by volume with 16.5% by volume of argon), using equipment as described and illustrated in the drawing.

In this case, an anode was used prepared as follows: a graphite cylindrical core having two diameters ($\phi$) and two heights (h) ($\phi$=18 mm and h=56 mm; $\phi$=12 mm and H=7 mm) was coated by means of a plasma spray technique with a tungsten coating which on the outside was ground to a 22 mm $\phi$ along its whole height. Finally the graphite core was bored to a 15 mm $\phi$ for a height h=56 mm and to a $\phi$ of 9 mm for h=7 mm. In this way there was obtained a main anode of the composite type consisting of tungsten covered on the inside by a 1.5 mm thick layer of graphite.

This anode was screwed on and affixed to a graphite support 26. The latter was of a flat configuration with a minimum thickness of 7 mm and with a diameter of 20 mm, while incorporating in said support injector holes 30 and 31 from their original location in the lower part of the main anode 29. The new holes 30–31 in their changed location with respect to the given figure, take up a position of 45° with respect to the axis of the furnace and communicate with inlets 24 and 25, through ducts 27 and 28.

Coil 50 is of the conventional type, operated by alternate current and having a number of turns such as to generate a magnetic field of 1000 gauss.

The connection with the positive pole of the electric power generator 46, is achieved by disconnecting line 47 from flanges 37 and closing switch 48.

The head of main anode 29, with respect to the front of the auxiliary (pilot) anode nozzle 7, was placed at a distance of about 25 mm, with throttling-mixer 15 made of graphite having a minimum diameter $\phi = 10$ mm and the screening socket-shaped and piece arranged so as to cover about three quarters of the height of the main anode 29.

Then comes the body-base of the furnace with the inside tube 41 of graphite having an inside diameter of 50 mm and a height of 500 mm.

This is followed by a filtering heat resistant cloth-type filter and by a hydrochloric acid removal installation for the gases based on contacting same with an alkaline solution.

The operational conditions in this instance were:

| | |
|---|---|
| Total current intensity (at main arc and at pilot arc) | 95 Amp. |
| Current intensity at pilot arc through resistor circuit | 10 Amp. |
| Arc voltage | 158 V |
| Total power | 15 KW |
| Feeding rate of arc gas: | |
| Argon fed into the inlet of conventional head | 1300 Nl/hr |
| Hydrogen fed to inlet 17 | 6600 Nl/hr |

The feeding of the hydrogen was achieved through the distributing cavity 17 and the series of injectors 16 which are arranged in a tangential way in order to generate a vortical inflow of the hydrogen:

| | |
|---|---|
| Feeding of reactant: | |
| TiCl$_4$ fed to inlet (25) | 1587 kg/hr |
| CH$_4$ fed to inlet (24) | 178 Nl/hr |
| Molar ratio $\frac{TiCl_4}{CH_4} = 1.0$ | |
| TiC hourly output: | 0.472 kg/hr |
| Theoretical conversion with respect to TiCl$_4$ and CH$_4$ | 98.8% |
| Power consumption (KWh) per kg of TiC | 31.8 KWhr/kg |
| Concentration of reactants: (TiCl$_4$ + CH$_4$) in injected plasma (A + H$_2$ + TiCl$_4$ + CH$_4$): $\frac{178 + 178}{178 + 178 + 1300 + 6000} \cdot 100 = 4.3\%$ | |

The test lasted two hours and 55 minutes following ignition of the plasma arc. The reactants were injected into the furnace after a period of 30 minutes, intended as a pre-heating period of the furnace by means of the plasma arc in action.

During the last 35 minutes, the feeding of the reactants was interrupted, and therefore the duration of the reaction between the injected reactants amounted to 1 hour and 50 minutes.

At the end of the test the electrodes were checked. The cathode was found to be perfectly preserved. The main anode had lost the 1.5 mm thickness of the graphite used as coating of the inside of the tungsten anode for about 80% of its height. Only in the lower portion, where anode 29 is affixed to the graphite support 26, did the initial graphite coating of 1.5 mm remain.

The strong radiation caused by the electronic condensation of the plasma arc in the presence of atomic and ionic hydrogen, must doubtless be considered the cause of the chemical corrosion of the graphite with the formation of hydrocarbons.

As to the tungsten metal of the main anode it was observed, on the contrary, that it had not suffered any alteration and that it remained undamaged despite being exposed to a particularly burdensome operational condition in the absence of the reactants (which due to the endothermicity of the reaction causes a non-negligible subtraction of heat) both in the initial as well as in the final stage or period.

The auxiliary (pilot) anode 7 proved perfectly preserved.

No corrosion phenomena were observed as far as the graphite parts were concerned which corresponded to elements 26, 42 and 41.

The TiC thus obtained was examined by X-ray. This analysis evidenced only only peaks typical of the cubic TiC only.

EXAMPLE 3

This example shows the preparation of the TiC from TiCl$_4$ and CH$_4$ in a plasma lacking any direct supply of hydrogen that is not part of the desired stoichiometric reaction.

This preparation is carried out with the same equipment as described above in Example 2, in which the main anode 29 has been replaced by a new anode of identical dimensions and construction.

The operational running of the equipment was characterized by the fact that through inlet 18 and through the series of tangential injector nozzles 16, methane was fed instead of hydrogen, which latter was completely eliminated from this process cycle. For the TiCl$_4$, on the contrary, the feeding path through inlets 24 and 25 was maintained unvaried.

Otherwise the test was conducted in a way altogether similar to that already described in Example 2.

No corrosion phenomena was detected in any of the various parts of the equipment. Even the 1.5 mm thick graphite lining of the inner cylindrical wall of the main anode remained unaltered, contrary to what happened in the test of Example 2. That is to say that in the absence of hydrogen, and using as a non-reactive gas (for the purposes of the preparation of TiC) a noble gas such as argon, it is surprisingly found that the electrodes (including the main anode 29) remain perfectly unaltered, even through the quantity of noble gas used for the plasma arc is exceptionally low (0.087 Nm$^3$/KWhr).

The TiC thus obtained was examined by X-ray and evidenced only peaks typical for the cubic TiC.

EXAMPLE 4

On the TiC products obtained in Examples 2 and 3, as well as on TiC product obtained by the carbothermic way ($TiO_2 + 2C \rightarrow TiC + CO$) in conventional Tamman type furnaces, there were carried out thermogravimetric tests for examining the degree of resistance to thermal oxidation and to bring out the relationship thereof with the adopted preparation process.

The results obtained are recorded on Table 1 below. They show that the submicronic TiC power preparation with the plasma process of the present invention in the absence of hydrogen, through the use of the reactor as described above, displays a surprising resistance to thermal oxidation equal to that of the coarse product obtained from the carbothermal process, and a very much higher resistance than that of the submicronic powder obtainable with a plasma process in the presence of hydrogen.

Since it is very important to obtain a product with a very fine granulometry, and at the same time very important that this product shall also show a good resistance to thermal oxidation, it is quite apparent that the product obtainable with the plasma process according to the present invention without hydrogen offers important advantages over the prior art.

EXAMPLE 5

This example illustrates the preparation of TiC from $TiCl_4$ and $CH_4$ in a plasma free of any sort of direct feed of hydrogen that is not part of the stoichiometry of the desired reaction.

This preparation is carried out with the same equipment as that described above in Example 2. In this example the only variant from the procedure of Example 3 consists in inverting respectively the locations of the inlets for the $TiCl_4$ and the $CH_4$.

More particularly, here the $TiCl_4$ was fed through distribution cavity 17 and the series of tangential injectors 16, so as to impart thereto a vortical movement in the zone of the introduction to the argon plasma.

The $CH_4$ was fed through inlet 25, duct 27 and nozzle 30, located as described in Example 2.

The obtained TiC, like the product of Example 3, proved to be pure upon X-ray examination while showing the desired submicronic granulometry.

EXAMPLE 6

This example shows the preparation of TiC from $TiCl_4$ and $CH_4$ in a plasma free from any direct feed of hydrogen that is not part of the stoichiometry of the desired reaction.

This preparation was carried out with the equipment already described in the accompanying drawing. This equipment differs from that used in Examples 2, 3, 4 and 5 in that instead of anode 29 and graphite support 26 (of the flat type and with a minimum height 7 mm) an anode on a tubular support 370 mm high was used, exactly as reproduced in the attached drawing.

The $TiCl_4$ was fed through distribution cavity 17 and through the series of tangential injectors 16 so as to impart to it a vortical movement in the zone of introduction into the argon plasma.

The $CH_4$ was fed in through radial injector tube 60 located in an orthogonal or angular position with respect to the axis of the furnace.

The TiC, obtained in a submicronic granulometry, proved under X-ray examination to be pure like the product obtained in Example 3.

The operational conditions here were as follows:

| | |
|---|---|
| Total current intensity (at main arc and at pilot arc) | 121 Amp. |
| Current intensity at pilot arc through circuit (49) | 10 Amp. |
| Arc voltage | 170 V |
| Total power | 20.5 KW |
| Feeding rate of arc gas: | |
| Argon fed at inlet 9 of the conventional head | 1000 Nl/hr |
| $TiCl_4$ fed in through inlet (17) | 8.33 Nl/hr |
| $CH_4$ fed in through inlet (30') | 0.985 Nl/hr |
| Molar ratio $\dfrac{TiCl_4}{CH_4}$ | 1.0 |
| Hourly production of TiC: | 2.5 kg/hr |
| Theoretical conversion with respect to the fed in $TiCl_4$ and $CH_4$ | 95% |
| Power consumption (KWh) per kg of TiC | 8.2 KWhr/kg |
| Concentration of reactants ($TiCl_4 + CH_4$) in the injected plasma (A + $TiCl_4$ + $CH_4$) $\dfrac{0.985 + 0.985}{0.985 + 0.985 + 1.0} \cdot 100 = 66.6\%$ by vol. | |
| Consumption of argon gas ($Nm^3$) per kg of TiC | 0.4 $Nm^3$/kg |

After a period of uninterrupted running for 1.5 hours it was found that neither the electrodes nor any other part of the furnace had suffered any corrosion or other damage.

The main operational parameters and the results obtained, as shown in Examples 1, 2, 3, 5 and 6, have been summarized in Table 2 below which evidences the advantages obtainable with this process in the absence of hydrogen according to this invention, in comparison with the results obtainable with the processes of the prior art and of the above-identified co-pending application (in the presence of hydrogen) as mentioned in Examples 1 and 2 respectively.

There are obtainable high yields based on both reactants, in addition to the advantage of a lower gas consumption in the formation of the plasma and a lower energy consumption per kg of product obtained. Moreover, the convenient use of graphite as the material for the main anode avoids the risk of chemical corrosion phenomena. In addition, the produced powders offer better thermal resistance characteristics against oxidation, at least as far as titanium carbide is concerned.

The process according to this invention may, moreover, be used for the production of other products depending on reactions that use either metal or metalloid halides.

In fact, such halides, when injected into the noble gas plasma (which is fed in at limited feeding rates), very conveniently give rise to reactive fluidodynamic masses having a high thermal content and a high concentration of reactable species which, when in their turn injected with other reacting species, impart to the reaction system the best conditions for the production of desired end products.

Lastly, the process of this invention allows one readily to produce other ceramic and non-ceramic products as well as also metal and metalceramic products.

TABLE 1

OXIDATION OF TiC in a current of oxygen.

| Type of product | Granulometry | Start of oxidation | End of oxidation | Increase in % by weight |
|---|---|---|---|---|
| TiC (carbothermal process) | >1μ | 400° C. | 910° C. | 33.2 |
| TiC (argon-hydrogen plasma process) | ≈0.12μ | 300° C. | 470° C. | 29.5 |
| TiC (argon-plasma process) | ≈0.03 μ | 390° C. | 900° C. | 15.5 |

Theoretical increase % = 33.2

TABLE 2

| Example | \multicolumn{5}{c}{Main parameters of the process} |
|---|---|---|---|---|---|
|  | 1 | 2 | 3 | 5 | 6 |
| Type of reactor | Conventional with cooled anode | According to co-pending application Serial No. 20242A/76 | According to co-pending application | According to co-pending application | According to co-pending application |
| Magnetic field coil | absent | of conventional type | of conventional type | of conventional type | of conventional type |
| Total power in plasma arc Kw | 45 | 15 | 15 | 15 | 20.5 |
| Material of anode | Cu (cooled) | W (graphite lined) | W (graphite lined) | W (graphite lined) | graphite |
| Concentration of reactants in injected plasma % by vol. | 14.8 | 4.3 | 21.5 | 21.5 | 66.5 |
| Molar ratio $\frac{TiCl_4}{CH_4}$ % | 1 | 1 | 1 | 1 | 1 |
| Yield in TiC with respect to the TiCl$_4$ in % | 51 | 98.8 | — | — | 95 |
| Yield in TiC with respect to the CH$_4$ in % | 51 | 98.8 | — | — | 95 |
| Hourly output of TiC in kg/hr | 1.39 | 0.472 | — | — | 2.5 |
| Energy consumption for unity of product in KWh/kg of TiC | 32.3 | 31.8 | — | — | 8.2 |
| Hydrogen consumption (as plasma forming gas) per unity of product in Nm$^3$/kg TiC | 8.45 | 14.00 | 0 | 0 | 0 |
| Consumption of argon (as a plasma forming gas) per unity of product Nm$^3$/kg TiC | 0 | 2.75 | — | — | 0.4 |
| Gas used for the formation of the plasma | 100% H$_2$ | 16.55% A 83.5% H$_2$ | 100% A | 100% A | 100% A |
| $\frac{Nl/h}{Kw}$ ratio between gas used for formation of the plasma with respect to the power applied to the arc: | 262 | 527 | 87 | 87 | 48.6 |
| Possibility of use of a graphite anode | none | none | favorable | favorable | favorable |
| Resistance of a graphite anode | impossible | very bad | excellent | excellent | excellent |

What is claimed is:

1. In a plasma-arc process for the production of a carbide powder, according to endothermic reactions the improvement comprising carrying out, in a furnace with an anodic function without dissipative cooling, a series of steps comprising:

(a) forming a chemically reactive fluidodynamic mass having a high thermal content and a high concentration of the desired reactive species, by injecting into the electronic column of a noble gas plasma-arc at least one metal or metalloid halide and a hydrocarbon, the injection taking place, with mixing, through a choker-injector-mixer nozzle which is electrically insulated;

(b) causing the electronic condensation of said mass inside a main nozzle anode made of tungsten or graphite, without dissipative cooling;

(c) injecting into said electronically condensed mass the residual part of said reactants necessary to bring about the desired main chemical reaction for producing the carbide powder; and wherein the total volume of the reactants is equal to or greater than 20% of the total aeriform volume formed by the total volume of the reactants plus the volume of noble gas that pilots and stabilizes the plasma-arc itself.

2. A process according to claim 1, characterized in that said electronic condensation of said mass is carried out in a nozzle-shaped main anode made of graphite.

3. A process according to claim 1, wherein the plasma-arc for carrying out the process is based on argon as the noble gas.

4. A process according to claim 1, wherein the reactants are $TiCl_4$ and $CH_4$, resulting in the production of TiC powder.

5. A process according to claim 4, wherein besides $TiCl_4$ and $CH_4$ and the reaction products thereof, argon is the only substance present in the reaction zone.

6. A process according to claim 1, wherein during the injection (c) of the residual part of the reactants into said fluidodynamic mass already electronically condensed inside the nozzle shaped main anode, one or more of the reactants are admixed with one or more solid substances in the form of a fine powder, said substances having the function of acting as nucleating agents or dispersion agents, wherein said substances are chemically either the same or different from the product resulting from the main reaction, respectively.

7. A process according to claim 1, wherein the powder produced by the main chemical reaction in subjected, for the purpose of controlling the granulometric characteristics of said powder, to a subsequent reaction brought about by interaction with one or more reactants introduced into a zone of the furnace located below the zone in which the main reaction takes place.

8. A process according to preceding claim 1, wherein said process includes the use of hydrogen only as a reactant for a desired chemical reaction, said hydrogen being injected into the fluidodynamic mass only after said mass has condensed electronically inside the nozzle-shaped main anode.

* * * * *